United States Patent
Melcher et al.

(10) Patent No.: US 7,766,052 B2
(45) Date of Patent: Aug. 3, 2010

(54) CONDUIT PIPE FOR CONVEYING MEDIA

(75) Inventors: Walter Melcher, Tecklenburg (DE); Ulrich Reiter, Osnabrück (DE); Christoph Geyer, Osnabrück (DE); Christian Triquet, Brissendorf (DE); Matthias Konczalla, Osnabrück (DE)

(73) Assignee: KM Europa Metal Aktiengesellschaft, Osnabruck (DE)

( * ) Notice: Subject to any disclaimer, the term of this patent is extended or adjusted under 35 U.S.C. 154(b) by 770 days.

(21) Appl. No.: 11/631,099

(22) PCT Filed: Jun. 30, 2005

(86) PCT No.: PCT/DE2005/001152
§ 371 (c)(1),
(2), (4) Date: Mar. 27, 2007

(87) PCT Pub. No.: WO2006/005297
PCT Pub. Date: Jan. 19, 2006

(65) Prior Publication Data
US 2009/0233028 A1    Sep. 17, 2009

(30) Foreign Application Priority Data
Jul. 2, 2004 (DE) .................... 10 2004 032 028
May 19, 2005 (DE) .................... 10 2005 023 751

(51) Int. Cl.
*F16L 9/14* (2006.01)
(52) U.S. Cl. .................. 138/143; 138/127; 138/141; 138/137; 428/36.91
(58) Field of Classification Search ............... 138/140, 138/141, 137, 127, 139, 143; 428/36.91
See application file for complete search history.

(56) References Cited

U.S. PATENT DOCUMENTS

| 4,216,802 | A | * | 8/1980 | Bonnes et al. | 138/143 |
| 4,686,126 | A | * | 8/1987 | Hyodo et al. | 428/36.1 |
| 7,563,496 | B2 | * | 7/2009 | Watson | 428/35.7 |
| 2006/0093769 | A1 | * | 5/2006 | Biebuyck | 428/36.91 |

FOREIGN PATENT DOCUMENTS

| EP | 0 762 041 | | 8/1996 |
| WO | WO 9931424 A1 | * | 6/1999 |

* cited by examiner

*Primary Examiner*—Patrick F Brinson
(74) *Attorney, Agent, or Firm*—Kenyon & Kenyon LLP

(57) ABSTRACT

A conduit pipe for conveying media, having a core pipe made of a copper alloy and a jacketing made of a plastic material from the group of the polyolefins having functional groups. The ratio between the thickness of the jacketing wall and the thickness of the core pipe wall ranges between 2:1 and 14:1, while the ratio between the thickness (D) of the core pipe wall and its inside diameter (ID) ranges between 0.01 and 0.05.

21 Claims, 1 Drawing Sheet

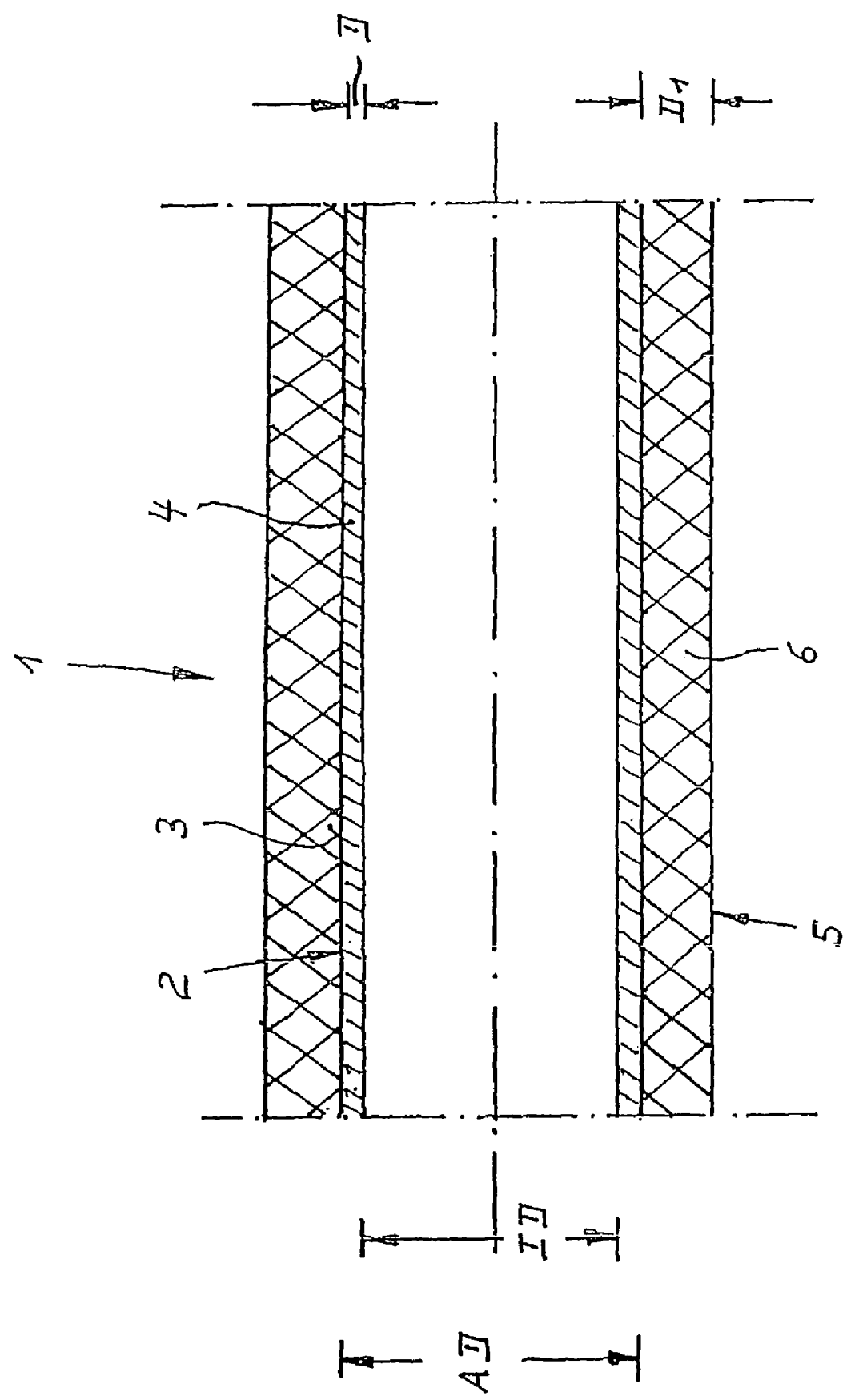

CONDUIT PIPE FOR CONVEYING MEDIA

BACKGROUND OF THE INVENTION

1. Field of the Invention

The invention relates generally to a conduit pipe for conveying media.

2. Description of Related Art

A conduit pipe which is made up of a metallic core pipe and a jacketing of thermoplastic material is known as related art from EP 762,041. The metallic core pipe is made of copper, in this instance. The jacketing is formed of a thermoplastic material such as polyethylene. The wall thickness of the core pipe is 0.5 mm to 1 mm, at an outside diameter that is in a range of 10 mm to 22 mm. the wall thickness of the jacketing may be between 0.3 mm and 1.5 mm.

The known conduit pipe is used particularly for floor heating systems.

Although the known conduit pipe has entered practical use, it is encumbered by the characterization that the core pipe has to have a comparatively great wall thickness, so that it is able to be bent to desired radii without buckling. transversely. The admissible bending radii essentially depend on the ratio of the wall thickness of the core pipe to its outside diameter. In a floor heating system, for instance, the wall thickness of the core pipe calls for a great proportion of precious copper. whereby not only the material costs but also the weight of a conduit pipe that has to be handled, especially supplied as a coil, is noticeably increased. The handling of such coils is difficult and the bending of the conduit pipe also requires great bending force.

As a further peculiarity of the known conduit pipe one should note that the thermoplastic jacketing only envelops the core pipe, and is not connected to it in an adhering manner. If the ends of two conduit pipes have to be connected, it is necessary to remove the jacketing in this area. In addition, especially in the case of conduit pipes laid into the ground, it may happen then that in the connecting area moisture gets in between the core pipe and the jacketing, and this may lead to corrosion.

SUMMARY OF THE INVENTION

It is an object of the invention to create a conduit pipe for conveying media in which the use of copper is clearly reduced, and the handleability during its laying may be simplified.

This and other objects of the invention are achieved by a conduit pipe for conveying media, which is made up of a metallic core pipe (2) and a jacketing (5) made of a thermoplastic material, wherein the jacketing (5) is formed of a plastic material from the group of the olefins, having functional groups, the ratio of the thickness (D1) of the wall (6) of the jacketing (5) to the thickness (D) of the wall (4) of the core pipe (2) amounting to 2:1 to 14:1, and the ratio of the thickness (D) of the wall (4) of the core pipe (2) to its inside diameter (ID) amounting to 0.01 to 0.05.

BRIEF DESCRIPTION OF THE DRAWINGS

The present invention will be described in greater detail with reference to the following drawings wherein:

FIG. 1 shows a length section of a conduit pipe in accordance with the invention which may be used for the installation of a floor heating system.

DETAILED DESCRIPTION OF THE INVENTION

One essential constructional feature is that now, in order to form the jacketing, specifically a plastic from the group of polyolefins is used with functional groups. Nonpolar materials, such as polyolefins, don't enter into any adhesive connections with other materials, such as metals. By the merging of suitable functional groups, which react with the polar surfaces at elevated temperatures and form great chemical bonding forces, it is achieved that the jacketing enters into an adhesive connection with the surface of the core pipe. By the force-locking composite action of the jacketing with the core pipe, a conduit pipe is created that has a high resistive strength with respect to outer mechanical effects and has an especially good flexibility. In addition, this ensures good heat transfer as well as high corrosion resistance.

Because of the specific wall thickness dimensioning of the jacketing and the core pipe, as well as because of the adjusting of the ratio of the thickness of the wall of the core pipe to its inside diameter, good bending behavior is achieved, because the plastic and elastic behavior of the materials used is able to be brought to a certain ratio. The extremely small thickness of the wall of the core pipe, between 0.15 mm and 0.5 mm leads to a clear reduction in the overall weight, whereby large coil installations are able to be handled. Larger coil installations mean, for instance, fewer connecting locations and thus also fewer residual lengths, in connection with the laying of floor heating systems. The conduit pipe may be unreeled by hand from a coil without a problem and, to be sure, without additional auxiliary devices. The flexibility is excellent and there is only low restoring force.

The adhesive connection of the jacketing to the thin-walled core pipe makes it possible, in addition, to cut off a conduit pipe in a simple manner using cutting pliers or separating shears in a chipless manner. Squeezing the pipe with a change in cross section is certainly prevented.

Preferably, core pipes are used having an external diameter between 10 mm and 22 mm, and a wall thickness between 0.15 mm and 0.5 mm. The jacketing, in this instance, may have a wall thickness between 1.0 mm and 2.5 mm.

Finally, it should be mentioned that the conduit pipe according to the present invention is recyclable, because no cross-linked polyolefin is used.

The conduit pipe according to the present invention may be installed as drinking water pipe, floor pipe or heating pipe when the house is built. Use for irrigation systems is also conceivable. It can also be used for heat exchangers, evaporators and liquifiers. In addition, it is possible to use the conduit pipe to convey gases, water, oil or cooling media.

In one particularly advantageous refinement of the present invention, the ratio of the thickness of the wall of the jacketing to the thickness of the wall of the core pipe is 3:1 to 7:1.

If the core pipe is made of copper or a copper alloy, then, because of the material pairing of copper and polyolefin, there is low heat conductivity resistance, so that the use of the conduit pipe for heat transfer purposes is very effective. The core pipe is preferably drawn in a seamless fashion.

In a further embodiment, a core pipe of copper or a copper alloy is tinned on its outside surface. This creates especially good prerequisites for firmly and durably adhesive bonding between the jacketing and the core pipe.

The surface adhesion may also be improved if the outside surface of the core pipe is pretreated by pickling and subsequent passivation. In this connection, preferably reagents based on benzotriazole get to be used. However, it is also conceivable to make the core pipe of stainless steel.

An alternative is also conceivable in which the core pipe is tinned on its inside surface. This pipe that is tinned on its inside surface may also be welded longitudinally.

Even the core pipe variant that is not tinned on the inside is able to be designed to be welded longitudinally.

Conduit pipe 1 includes a core pipe 2 made of a copper alloy. Outside surface 3 of core pipe 2 is tinned.

Thickness D of wall 4 amounts to 0.3 mm. Its outside diameter AD comes to 12 mm, so that inside diameter ID amounts to 11.4 mm.

A jacketing 5 is applied to core pipe 2, which is formed of a plastic from the group of polyolefins having functional groups. Because of that, jacketing 5 enters into an adhesive connection with outside surface 3 of core pipe 2. Thickness D1 of wall 6 of jacketing 5 amounts to 2 mm.

Because of these dimensions, the ratio of thickness D1 of wall 6 of jacketing 5 to thickness D of wall 4 of the core pipe amounts to 6.7:1, while the ratio of the thickness D of wall 4 of core pipe 2 to its inside diameter ID amounts to 0.03.

What is claimed is:

1. A conduit pipe for conveying media, comprising: a metallic core pipe (2) and a jacketing (5) made of a thermoplastic material, the jacketing (5) being formed of an olefin having functional groups selected to react with polar surfaces at elevated temperatures to adhere the jacketing in a position around the metallic core pipe, wherein the ratio of thickness (D1) of wall (6) of the jacketing (5) to thickness (D) of wall (4) of the core pipe (2) is from 2:1 to 14:1, and the ratio of the thickness (D) of the wall (4) of the core pipe (2) to its inside diameter (ID) is from 0.01 to 0.05.

2. The conduit pipe according to claim 1, wherein the ratio of the thickness (D1) of the wall (6) of the jacketing (5) to the thickness (D) of the wall (4) of the core pipe (2) is from 3:1 to 7:1.

3. The conduit pipe according to claim 1, wherein the core pipe (2) is made of copper or a copper alloy.

4. The conduit pipe according to claim 2, wherein the core pipe (2) is made of copper or a copper alloy.

5. A conduit pipe for conveying media, comprising: a metallic core pipe (2) and a jacketing (5) made of a thermoplastic material, the jacketing (5) being formed of an olefin having functional groups, wherein the ratio of thickness (D1) of wall (6) of the jacketing (5) to thickness (D) of wall (4) of the core pipe (2) is from 2:1 to 14:1, and the ratio of the thickness (D) of the wall (4) of the core pipe (2) to its inside diameter (ID) is from 0.01 to 0.05, wherein a core pipe (2) of copper or a copper alloy is tinned on its outside surface.

6. A conduit pipe for conveying media, comprising: a metallic core pipe (2) and a jacketing (5) made of a thermoplastic material, the jacketing (5) being formed of an olefin having functional groups, wherein the ratio of thickness (D1) of wall (6) of the jacketing (5) to thickness (D) of wall (4) of the core pipe (2) is from 2:1 to 14:1, and the ratio of the thickness (D) of the wall (4) of the core pipe (2) to its inside diameter (ID) is from 0.01 to 0.05, wherein the ratio of the thickness (D1) of the wall (6) of the jacketing (5) to the thickness (D) of the wall (4) of the core pipe (2) is from 3:1 to 7:1, and wherein a core pipe (2) of copper or a copper alloy is tinned on its outside surface.

7. The conduit pipe according to claim 1, wherein a core pipe (2) of metal is pretreated on its outside surface (3) with reagents that improve the connection to the metal surface.

8. The conduit pipe according to claim 2, wherein a core pipe (2) of metal is pretreated on its outside surface (3) with reagents that improve the connection to the metal surface.

9. The conduit pipe according to claim 3, wherein a core pipe (2) of metal is pretreated on its outside surface (3) with reagents that improve the connection to the metal surface.

10. A conduit pipe for conveying media, comprising: a metallic core pipe (2) and a jacketing (5) made of a thermoplastic material, the jacketing (5) being formed of an olefin having functional groups, wherein the ratio of thickness (D1) of wall (6) of the jacketing (5) to thickness (D) of wall (4) of the core pipe (2) is from 2:1 to 14:1, and the ratio of the thickness (D) of the wall (4) of the core pipe (2) to its inside diameter (ID) is from 0.01 to 0.05, wherein a core pipe (2) of metal is pretreated on its outside surface (3) with reagents that improve the connection to the metal surface, and wherein the reagents are based on benzotrialoze.

11. The conduit pipe according to claim 1, wherein the core pipe (2) is made of stainless steel.

12. The conduit pipe according to claim 2, wherein the core pipe (2) is made of stainless steel.

13. A conduit pipe for conveying media, comprising: a metallic core pipe (2) and a jacketing (5) made of a thermoplastic material, the jacketing (5) being formed of an olefin having functional groups, wherein the ratio of thickness (D1) of wall (6) of the jacketing (5) to thickness (D) of wall (4) of the core pipe (2) is from 2:1 to 14:1, and the ratio of the thickness (D) of the wall (4) of the core pipe (2) to its inside diameter (ID) is from 0.01 to 0.05, wherein the core pipe (2) is tinned on its inside surface.

14. The conduit pipe according to claim 2, wherein the core pipe (2) is tinned on its inside surface.

15. The conduit pipe according to claim 3, wherein the core pipe (2) is tinned on its inside surface.

16. The conduit pipe according to claim 1, wherein the core pipe (2) is welded longitudinally.

17. The conduit pipe according to claim 2, wherein the core pipe (2) is welded longitudinally.

18. The conduit pipe according to claim 3, wherein the core pipe (2) is welded longitudinally.

19. The conduit pipe according to claim 13, wherein the core pipe (2) is welded longitudinally.

20. The conduit pipe according to claim 13, wherein the ratio of the thickness (D1) of the wall (6) of the jacketing (5) to the thickness (D) of the wall (4) of the core pipe (2) is from 3:1 to 7:1.

21. The conduit pipe according to claim 13, wherein the core pipe (2) is made of copper or a copper alloy.

* * * * *